March 19, 1935. G. E. NEVILL Re. 19,505

DEVICE FOR RECORDING DEVIATION FROM THE VERTICAL IN WELLS

Original Filed March 21, 1927 2 Sheets-Sheet 1

GALE E. NEVILL
INVENTOR
BY Jesse R. Stone
ATTORNEY

March 19, 1935. G. E. NEVILL Re. 19,505

DEVICE FOR RECORDING DEVIATION FROM THE VERTICAL IN WELLS

Original Filed March 21, 1927 2 Sheets-Sheet 2

GALE E. NEVILL INVENTOR

BY Jesse R. Stone

ATTORNEY

Reissued Mar. 19, 1935 Re. 19,505

UNITED STATES PATENT OFFICE 19,505

DEVICE FOR RECORDING DEVIATION FROM THE VERTICAL IN WELLS

Gale E. Nevill, Houston, Tex.

Original No. 1,704,543, dated March 5, 1929, Serial No. 177,030, March 21, 1927. Application for reissue August 31, 1929, Serial No. 389,788

13 Claims. (Cl. 234—5.3)

My invention relates to a means for use in wells, mines and the like for indicating the deviation of the well from the vertical, the amount of such deviation and the position thereof in the well.

In the drilling of wells and particularly deep wells for oil, gas, sulphur and the like, it has been found practically impossible to drill a well which is exactly vertical, in fact the deviation of the well from the vertical has been found to be so great in some cases as to amount to many feet. This deviation may be in any direction and the direction may vary at different points in the well. It will be obvious that in some cases where the deviation amounts to from ten to fifty feet, as may frequently be the case, the bottom of the well may be across the line between adjacent properties so that a producing well may be taking oil from beneath property not belonging to the operator.

It is an object of my invention to provide a device which may be lowered into the well and produce an automatic record of the deviation of the well and its direction at all points traversed by the device, so that an accurate record may be obtained and kept of the path of the instrument from the top to the bottom of the well.

It is desired to produce a graphic representation of the path of the drill in drilling the well and to show the exact position of any deviation from the vertical and the amount of such deviation so that the lateral drift of the drill may be obtained and the bottom of the well may be accurately located.

The construction of the instrument contemplates the provision of means to orient and operate the device so that the record may be accurate and reliable.

In the drawings, Fig. 1 illustrates a top plan view of the invention, certain parts being in horizontal section for greater clearness.

Like numerals of reference are employed to designate like parts in all the views.

Figure 4:
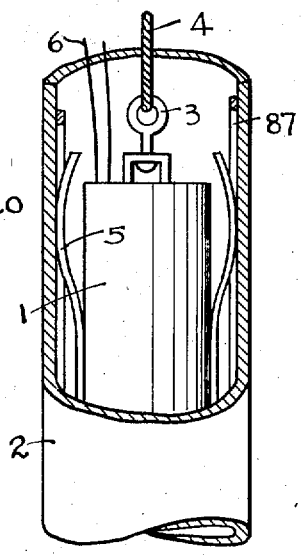
Fig. 4 is a side view showing a well pipe in broken section with a housing for my invention therein.

In carrying out my invention, I contemplate providing a recording mechanism which may be housed within a housing, preferably of cylindrical outline, as shown at 1 in Fig. 4. This housing is of smaller external diameter than is the interior of the casing 2, in which it is used. Said housing is provided with a swivel connection, indicated at 3, to a cable 4 or other means for lowering the device into the well having therein a casing of uniform diameter throughout its length. The housing 1 may be provided on opposite sides thereof with bowed arms 5 of resilient material, tending to bear firmly against the side walls of the casing and to engage between the axial guides 87 attached to the interior of the casing to guide the housing downwardly within the well in such manner that it may not rotate in its passage through the well casing. It is contemplated that a motor may be provided within the housing 1 for operating my device and in such case, electrical conducting wires 6 may extend from the housing to the surface for connection with some source of electricity.

Within the housing, I contemplate mounting a frame work 7, so formed as to support the operative parts of my device. Upon this frame 7 is mounted for rotation a shaft 8 which has thereon a pulley 9 or other similar means for operatively connecting the same with some constant speed motor, not shown, but similar to that shown in Fig. 5.

Figure 1:
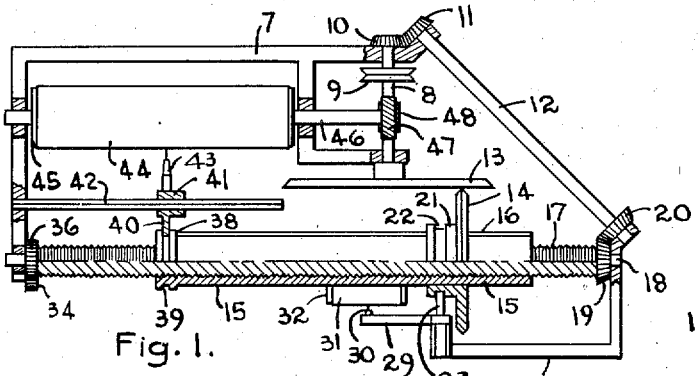
Figure 2:
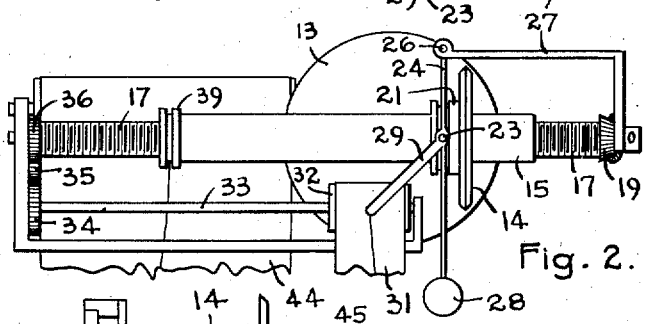
Fig. 2 is a front elevation of the device.

On one end of the shaft 8 is secured a beveled gear 10 adapted to mesh with and communicate rotation to a gear 11 adjacent thereto, said gear being mounted upon a shaft 12 rotatable in the frame and at an angle to the shaft 8, as clearly seen in Fig. 1.

The shaft 8 has mounted upon its inner end a friction disc 13, the forward face of which is adapted to frictionally engage with a friction disc 14, keyed slidably to a sleeve 15 by means of the key 16 thereon.

The sleeve 15 is of suitable length and has a threaded engagement with a shaft 17, upon which it is screwed. The shaft 17 is mounted at one end 18 within the frame work of the device and has a beveled gear 19 thereon operatively connected with a beveled gear 20, upon the shaft 12, previously described. The rotation of the shaft 12 will, therefore, communicate rotation to the shaft 17 and the sleeve 15 thereon. The friction disc 14 has thereon at one side a hub 21 which has a circumferential groove 22 therein to receive a finger 23, mounted upon the arm 24 of a pendulum suspended at 26 to an arm 27 upon the frame work at a point at one side of the hub 21 and in such position that the finger 23 on said pendulum will fit evenly within the groove 22 of the hub of the friction disc 14. A pendulum bob 28 hangs below the shaft 17 and the weight thereof tending to maintain its vertical position to detect inclination of the housing, and will thus control the position of the friction disc 14 relative to the operating disc 13 when the housing is inclined in the plane of the pendulum or gravity operated device 24.

I also form upon the pendulum arm 24 a downwardly inclined arm 29, the lower end of which supports a marker 30, which is preferably a pen having ink thereon and adapted to impart a recording line upon a strip of recording paper 31. Said record strip engages with and is moved by a drum 32 mounted upon a shaft 33 within the frame and having on one end thereof a gear 34 meshing with an idle gear 35, which is in turn operatively engaged with a gear 36 upon the shaft 17.

The sleeve 15 has formed upon one end thereof a guide collar 38 which has a groove 39 therein adapted to receive an arm 40 upon a collar 41, slidable along a squared stub shaft 42, supported rigidly at one end within the frame of the instrument and extending in spaced relation parallel with the shaft 17. The movement of the sleeve 15 on the shaft 17 will, therefore, move with it the arm 40, the collar 41 and a marking instrument 43, which is extended laterally from said collar to bear against a recording sheet 44 upon a drum 45 adjacent said marker.

Figure 3:
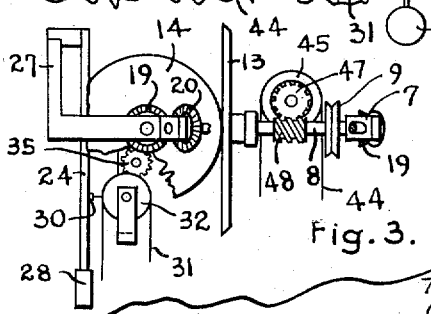
Fig. 3 is an end elevation thereof, certain parts being broken away.

The drum 45 is secured upon a shaft 46 mounted in the frame and having at one end thereof a worm gear 47, meshing with a similar gear 48 upon the shaft 8, as best seen in Fig. 3.

In the operation of the instrument as thus constructed, the device will be set on a horizontal level within the housing 1 and held in a properly oriented position within the well casing by means of arms 5 and guides 87 or any other preferred means for preventing relative rotation of the housing and the instrument within the well casing as it is lowered into the well. The shaft 8 connected with the motor will be rotated at a uniform speed and it is contemplated that the housing 1 containing the instrument will be lowered also at a uniform speed so that the distance from the surface of the ground to the instrument measured along the well bore can be determined.

The original position of the friction disc 14 relative to the disc 13 will be such that the speed of rotation imparted to the disc 14 and the sleeve 15 will be the same as the speed of rotation of the threaded shaft 17. There will, therefore, be no difference in the rate of rotation of the sleeve 15 and the shaft 17 upon which it is mounted.

If thereafter the well deviates from the vertical so as to cause the frame work of the instrument to be tipped about an axis parallel to pivot 26 to a position out of the horizontal, the frame work will rotate about the axis of the pendulum 24, depending upon the direction in which deviation occurs and this change in the direction of the well hole will be recorded by the pen 30 upon the recording sheet 31 which, as will be obvious, is constantly moving.

As a further result of the movement of the case the friction disc 14 will be moved toward or away from the center of the operating disc 13, thus decreasing or increasing its rate of rotation relative to that of the shaft 17. This will cause a differential movement between the friction disc 14 and the shaft 17, which will cause the sleeve 15 to be screwed to one or the other direction along the shaft 17. It is contemplated that the threaded connection between the sleeve 15 and its supporting shaft will be an exceedingly fine one, so that the amount of lateral movement of the sleeve upon the shaft, due to difference in rotation will be but slight. This movement of the sleeve 16 will be communicated to the pen or marker 43 which bears upon the sheet 44 moving upon the drum 45. This line showing the extent of deviation from the vertical will be marked upon the sheet 44 in a continuous graph which will furnish a visual record of the path of the drill in the drilling of the well and show at all levels the lateral drift of the well bore as projected onto the plane represented by the sheet 44.

It will be understood that two such projections taken on perpendicular planes will provide the coordinates of every point in the well bore and accurately determine the course of the well.

Figure 5:
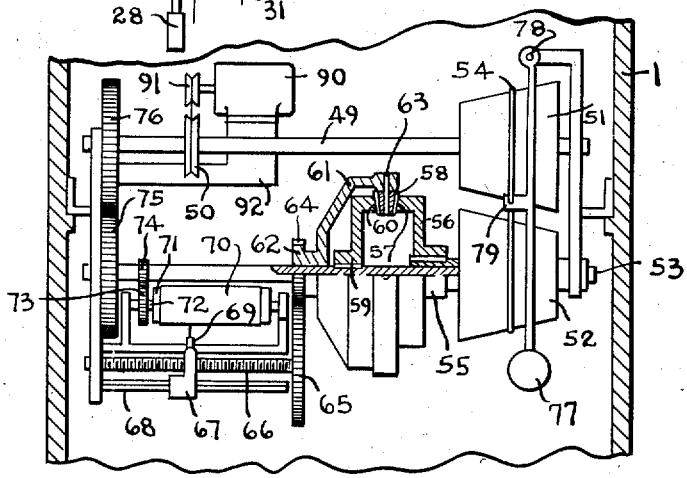
Fig. 5 is a front elevation partly in vertical section, showing a second embodiment of the invention.

As previously stated, the inventive idea may be carried out in various ways, the idea being to record the amount and direction of the deviation of the well from the vertical position which it should occupy. In Fig. 5 I have shown a shaft 49 mounted within a supporting frame work, and said shaft having a pulley 50 through which motion may be communicated to the said shaft. The pulley 50 may be driven by a suitable motor 90 and pulley 91, which may be of any desired type. The motor 90 is mounted on the bracket 92. On one end of said shaft is a frusto-conical shaped pulley 51, placed adjacent a similar pulley 52 upon a parallel adjacent shaft 53, also journaled for rotation within the frame work. The smaller diameters of the two adjacent pulleys 51 and 52 are pointed in opposite directions, thus providing a common type of speed change device between the shafts, through means of a belt 54 by which they are connected.

The shaft 53 has a sleeve 55 rotated thereon upon which the pulley 52 is mounted. On the inner end of the sleeve 55 is mounted a radial gear disc 56, the outer margin of which is formed with a toothed flange 57 thereon adapted to mesh with a series of beveled pinions 58. Thus the rotation of the pulley 52 will impart rotation to the gear 56, engaging with the said pinions 58.

The shaft 53 has mounted at a point spaced from the gear 56 a similar gear 59, rotatable with the shaft and having gear teeth 60 thereon, meshing with the pinions 58. Said pinions are mounted at spaced points upon a dished casing 61, one end of which is formed into a hub 62, rotatable upon the shaft 53. The pinions 58 are rotatable upon shafts 63 on the inner margin of the casing 61. The hub 62 has radial gear teeth 64 thereon which engage with the teeth upon a larger spur gear 65, mounted upon an adjacent shaft 66. Said shaft 66 is threaded throughout its length and has mounted thereon a supporting block 67 slidable along an adjacent supporting shaft 68 and moved on said shaft by means of its threaded connection with the shaft 66. A marking point or pen 69 is formed on said block 67 and is adapted to bear against a recording sheet 70 upon a drum 71, mounted upon the shaft 72, operatively connected through a gear 73 and adjacent gear 74 with the shaft 53.

The shaft 53 has on one end thereof a gear 75, meshing with a gear 76 upon the shaft 49. The two gears 75 and 76 are of the same diameter, thus adapting the two shafts 49 and 53 to rotate at the same speed. The belt 54 may be moved upon the pulleys 51 and 52 from its central neutral point in either direction by means of a pendulum 77, supported upon an arm in the frame at 78, whereby the pendulum will be positioned at a point at one side of the pulleys 51 and 52. An arm 79 on the pendulum arm is formed with a recess or notch therein to engage the belt 54, so that an inclination of the housing about an axis perpendicular to the plane of projection will move the belt one way or the other to vary the relative speeds of rotation of the shaft 49 and the sleeve 55 upon which the pulley 52 is mounted. This change of speed will be communicated through the gear 56 to the pinions 58 and the gear 64.

It will be seen that as the shaft 53 is rotating at the same speed as the shaft 49, there will be a differential movement of the gear 64, due to the change of speed imparted to the gear 56 relative to the gear 60. This will carry the housing 61 and the gear 62 about the shaft 53 in a direction depending upon the direction of deviation of the pendulum from the vertical. This will cause the rotation of the gear 65 and the shaft 66 and move the pen 69 upon the recording sheet 70 of the drum, thus making a record of the direction and the amount of deviation of the device from the vertical in one plane.

Figure 6:
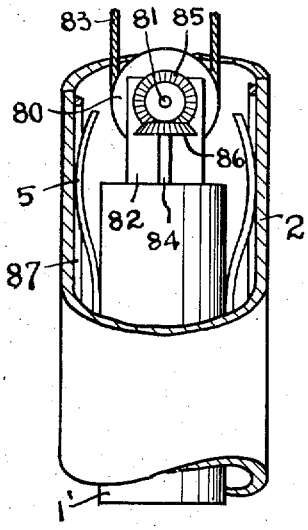
Fig. 6 is a view similar to Fig. 4 and illustrating a slightly different means for operating and guiding the device.

This instrument may be mounted within the housing 1', shown in Fig. 6, and if desired, the rotation of the pulley 50 and the shaft 49 may be actuated through a pulley 80 mounted upon a shaft 81 in a supporting plate 82 at the upper end of the housing. This pulley furnishes a means of suspending the housing within the well casing by means of a cable 83 extended to the surface. It is obvious that if one end of the cable 83 is held stationary and the device is lowered through unreeling the cable at the other side of the pulley, the speed of rotation of the said pulley 80 will depend upon the speed at which the device is lowered. The rotation of the pulley 80 may be imparted to a shaft 84 by means of the bevel gears 85 and 86. The shaft 84 extends into the housing and is operatively connected to the shaft 49. It is contemplated that if the device is lowered with a constant and regulated speed, the mechanism within the housing will also be operated at the same uniform speed so that the record strip or chart 70 will move in proportion to the lowering of the instrument, and data marked thereon by the pen 69 will be positioned to bear correct relation to the location of the instrument in the well, so that the chart will indicate the depth in the well at which irregularities occur in the plane considered.

The housing 1' may be guided within the casing to control its orientation within the well casing by means of the forming of lateral guides 87 upon the inner side of the casing between which the spring arms 5 may fit, thus assuring the operator that the housing 1' remains in its same position of orientation within the well throughout its travel in the well casing.

Figure 7:
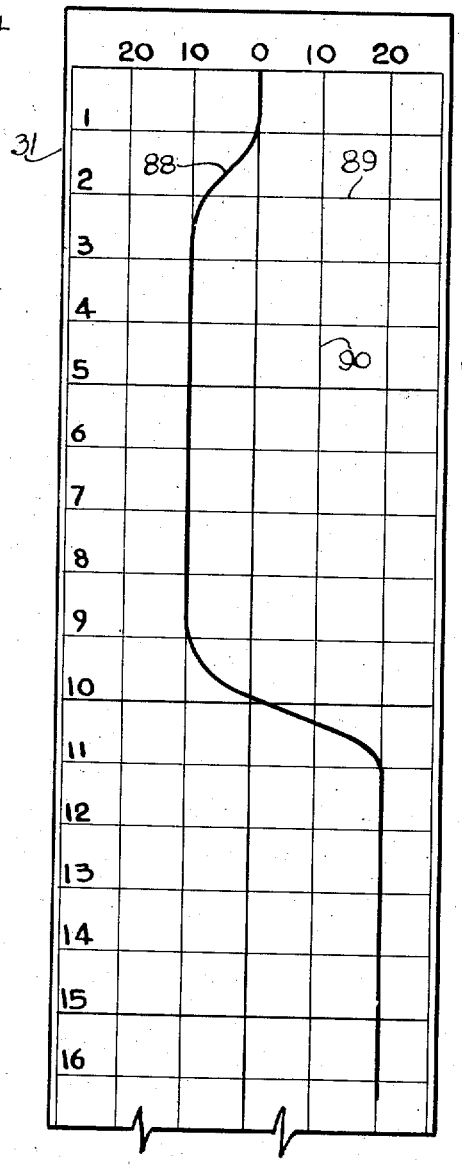
Fig. 7 is a view of a portion of a record sheet on which is recorded the angle of inclination of the well bore in one plane.

Fig. 7 shows a portion of the paper record chart 31 on which is recorded a continuous record 88 of the angle of inclination, in degrees, of the well bore in one plane as determined by the pendulum 28 and marked by pen 30. The particular record shown is that of a well from the surface of the ground to a depth of 1600 feet. The vertical graduations 89 are in hundreds of feet corresponding to distance along the well bore. The horizontal graduations 90 to either side of the center line are in degrees of angle of inclination at the respective depth. The angles recorded are in the plane of the arc of swing of the pendulum.

Figure 8:
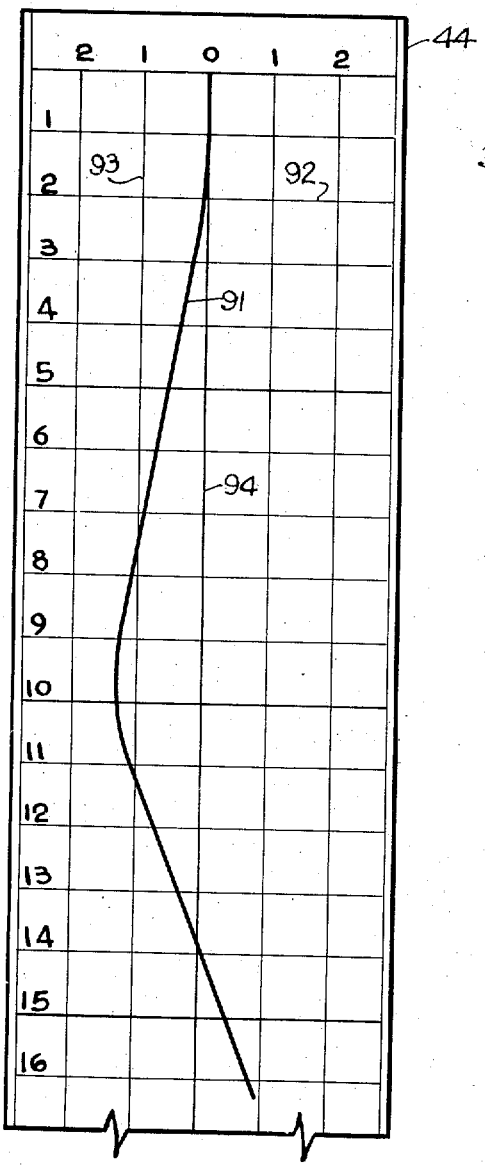
Fig. 8 is a view of a portion of another record sheet on which is recorded the lateral drift (in feet) of the well bore in the same plane and the same section of the well as recorded on the chart in Fig. 7.

Fig. 8 is a portion of the paper record chart 44 on which the line 91 is a continuous record, as made by the marker 43, showing the lateral drift of the well bore in the plane of the pendulum. The vertical graduations 92 are in hundreds of feet corresponding to distance along the well bore. The graduations 93 are in hundreds of feet corresponding to distance away from the theoretical center line 94 passing through the mouth of the well bore.

Considering Figs. 7 and 8 in their relation to one another as corresponding records of a well, the angles of inclination about an axis perpendicular to the plane of projection at any point as indicated by curve 88 may also be obtained as the slope of curve 91 at the corresponding point. For example, in the projection for the first one hundred feet the well is vertical as seen from chart 31, and therefore there is no lateral drift shown on 44. From 300 feet to approximately 850 feet, the sheet 31 indicates an angle of inclination of ten degrees which fact appears on 44 as the straight line at an angle of ten degrees to the vertical. Again, at approximately 990 feet, chart 31 indicates a return to the vertical and on chart 44 it is found that the tangent to curve 91 at this depth is vertical. Below 1100 feet chart 31 shows an angle of 20 degrees in the opposite direction which is observed on chart 44.

If the curve 88 represented the graph of a mathematical expression, then the curve 91 would represent the graph of a mathematical expression obtained by integrating the first expression.

If the curve 91 is defined by the expression $Y=f(X)$, then the expression for the curve 88 is $Y=d/dxf(X)$, or the derivative of the first expression, for curve 88 is a continuous record of the slope of curve 91 at every point. Conversely, the first integral of the function defining curve 88 will be the expression for curve 91.

In the operation of this device in the manner described, it will be seen that in the device disclosed in Figs. 1 to 4, inclusive, two separate records will be obtained—that upon the sheet 31 and also that upon the sheet 44. These two records should vary simultaneously with any variation in the vertical travel of the device and also indicate the amount of deviation from the vertical. Each sheet will record the direction of deviation. Sheet 31 will record the change and the angular deviation, while sheet 44 will furnish a graph indicating the path of the bit formed in drilling the well bore. This will be a graphic record and as the sheet upon which the record is made may be graduated and marked to scale, the exact amount of deviation in one plane may be readily seen from the record at all times.

As will be obvious, there should be two records at least obtained in a well, and the two records should be taken so that they represent projections on perpendicular planes. In this way the two graphs showing the deviation from the vertical will be in planes at right angles to each other, so that the deviation in either of these planes may be seen and recorded.

The advantages of this construction lie in the fact that the records obtained are continuous and the amount of deviation in one plane and at any point may be read directly from the record without necessity for computing the change mathematically as might be the case in previous forms of construction.

What I claim as new and desire to protect by Letters Patent is:

1. In a device of the character described, a frame, means to suspend said frame in a normally horizontal position, means to lower and raise said frame in a well bore, means to orient said frame in said well, a rotating shaft on said frame, a recording drum driven from said shaft, a screw shaft operatively connected with said first named shaft to rotate therewith at the same speed, a sleeve threaded on said screw shaft, a driving connection between said first named shaft and said sleeve, a marker bearing on said drum and controlled by said sleeve, and a pendulum on said frame controlling the driving connection for said sleeve, whereby a change in the horizontal position of said frame will rotate said sleeve and vary the position of said sleeve and marker.

2. A device of the character described, including a housing adapted to fit within a well casing, means to guide said housing in said casing, a normally horizontal frame in said housing, a pendulum supported on said frame, a rotatable shaft in said frame, a record sheet moved by said shaft, a second shaft at right angles thereto connected for operation at the same speeds as said rotatable shaft, a sleeve screwed on said second shaft, a friction disc keyed slidably on said sleeve, a friction disc on said rotatable shaft engaging said first named disc, a marker on said sleeve engaging said record sheet, and means controlled by said pendulum to regulate the movement of said marker.

3. A device of the character described, including a housing adapted to fit within a well casing, means to guide said housing in said casing, a normally horizontal frame in said housing, a pendulum supported on said frame, a rotatable shaft in said frame, a record sheet moved by said shaft, a second shaft at right angles thereto connected for operation at the same speed as said rotatable shaft, a sleeve screwed on said second shaft, a friction disc keyed slidably on said sleeve, a friction disc on said rotatable shaft engaging said first named disc, a marker on said sleeve engaging said record sheet, and means on said pendulum engaging said friction disc on said sleeve to move the same to regulate the movement of said marker.

4. A device of the character described, including a housing adapted to fit within a well casing, means to guide said housing in said casing, a normally horizontal frame in said housing, a pendulum supported on said frame, a rotatable shaft in said frame, a record sheet moved by said shaft, a second shaft at right angles thereto connected for operation at the same speed as said rotatable shaft, a sleeve screwed on said second shaft, a friction disc keyed slidably on said sleeve, a friction disc on said rotatable shaft engaging said first named disc, a marker on said sleeve engaging said record sheet, and a finger on said pendulum adapted to move said first named disc to control the movement of said marker.

5. In a device of the character described, a housing, a normally horizontal frame therein, an operating shaft, a threaded shaft at right angles thereto adapted to be rotated at the same speed as said operating shaft, a screw sleeve on said threaded shaft, a marker operated by said sleeve, a frictional gear connection between said operating shaft and said sleeve, a pendulum, means on said pendulum engaging said frictional gear and controlling said marker, and a movable record sheet against which said marker is adapted to contact.

6. A device of the character described including a support adapted to be lowered into a well bore, a gravity operated device on said support adapted to maintain a vertical position in one plane, a record sheet, a marker contacting said record sheet, a member rotatable in proportion to the rate of lowering of said support, and variable gearing actuating said marker, and controlled by said gravity operated device and said rotatable member to make a line on said sheet showing the lateral drift in one plane of the bore hole relative to the vertical.

7. A well surveying instrument comprising a support, means to lower said support into the well, means to orient said instrument, a plumb bob thereon tending to maintain an assumed position relative to the vertical in one plane, and means operatively connected with said plumb bob to determine and record the lateral drift in said one vertical plane of the well bore.

8. A well surveying instrument including a housing, means to lower said housing into the well, means to orient said housing, a pendulum in said housing and responsive to the inclination of said housing in one plane, a means rotatable at a rate proportional to the rate of lowering of said housing, a member rotatable at a speed proportional to the inclination of said housing with respect to said pendulum, and a marker responsive to the rotation of said member and said means, and movable to record the lateral drift of the well bore in said one plane.

9. In a device of the character described, a housing lowerable in a well bore, means to raise and lower said housing, means to orient said housing, means to determine the inclination of said housing in a plane, a variable speed drive responsive to the inclination of said housing in said plane and the movement of said housing along the well bore to determine the lateral drift of the well bore in said plane, and a marker responsive to said variable speed drive to continuously record said lateral drift.

10. In a device of the character described, a case lowerable in a well bore, means for raising and lowering said case in said well bore, a pendulum in said case responsive to the inclination of the well bore in the plane of the pendulum, a member rotatable in proportion to the rate of lowering of said device, a variable speed friction drive, and means controlled by said pendulum and engaging said drive whereby the relative speeds of rotation of the said drive are proportional to the inclination of the base.

11. A well surveying instrument adapted to determine the lateral drift of a well bore in one plane, comprising a housing lowerable in a well bore, means to orient said housing, means to determine the inclination of said housing in the one plane, an integrating mechanism responsive to said second means and the axial travel of said housing along the well bore to determine the lateral drift of the well in the plane as said housing moves within said well bore, and a marker associated with said integrating mechanism and engaging a record sheet.

12. A device for determining the lateral drift of well bores including a housing lowerable in a well bore, means for determining one component of the inclination of said housing from the vertical, an integrating mechanism adapted to correlate the travel of said device along the well bore and the angle determined by said means to determine the lateral drift of said housing and well bore in the plane of the component, and means to record the lateral drift.

13. An instrument of the character described including a housing adapted to be lowered into a well bore, a device therein adapted to determine one component of the inclination of said housing relative to the vertical, means in said housing and connected with said device and responsive to variations of said component and the movement of said housing along the well bore to determine the lateral drift of said housing at any level in the plane of the component.

GALE E. NEVILL.